C. W. BURROWS.
METHOD OF AND APPARATUS FOR TESTING MAGNETIZABLE OBJECTS BY MAGNETIC LEAKAGE.
APPLICATION FILED OCT. 4, 1917.
1,322,405.
Patented Nov. 18, 1919.
3 SHEETS—SHEET 1.
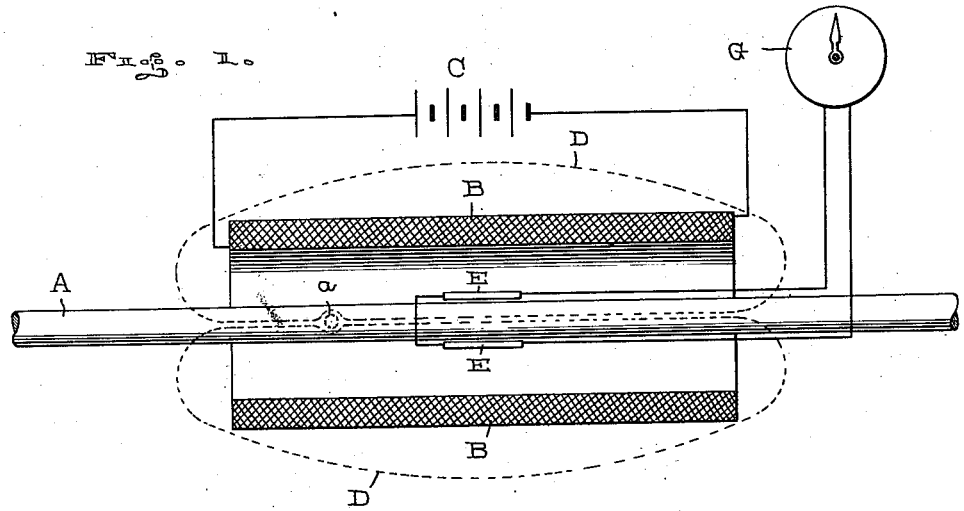
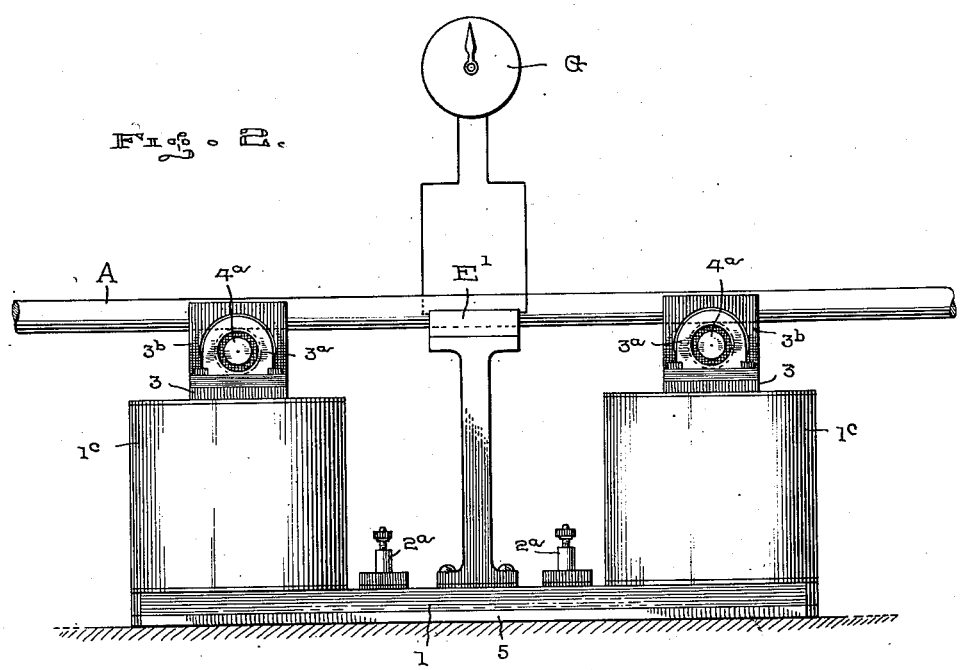
Inventor
Charles W. Burrows
By Alexander Dowell
Attorneys C. W. BURROWS.
METHOD OF AND APPARATUS FOR TESTING MAGNETIZABLE OBJECTS BY MAGNETIC LEAKAGE.
APPLICATION FILED OCT. 4, 1917.
1,322,405.
Patented Nov. 18, 1919.
3 SHEETS—SHEET 2.
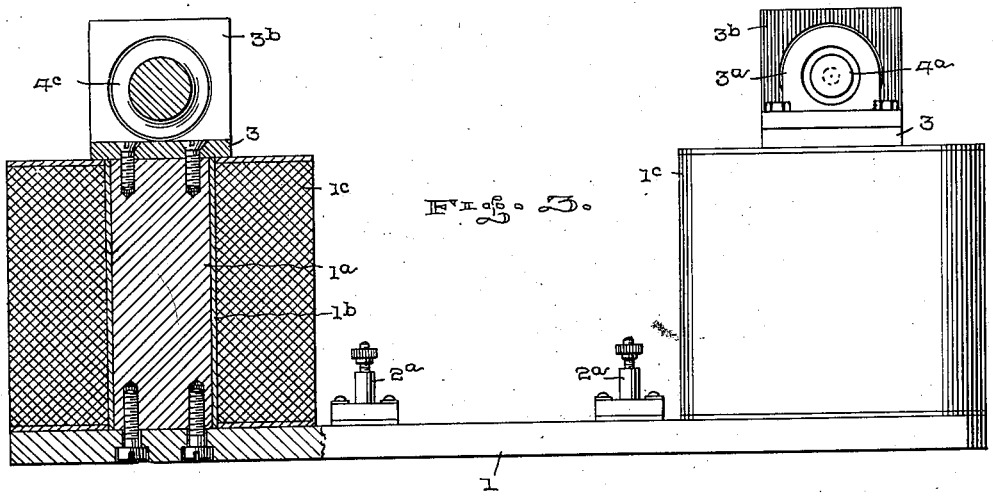
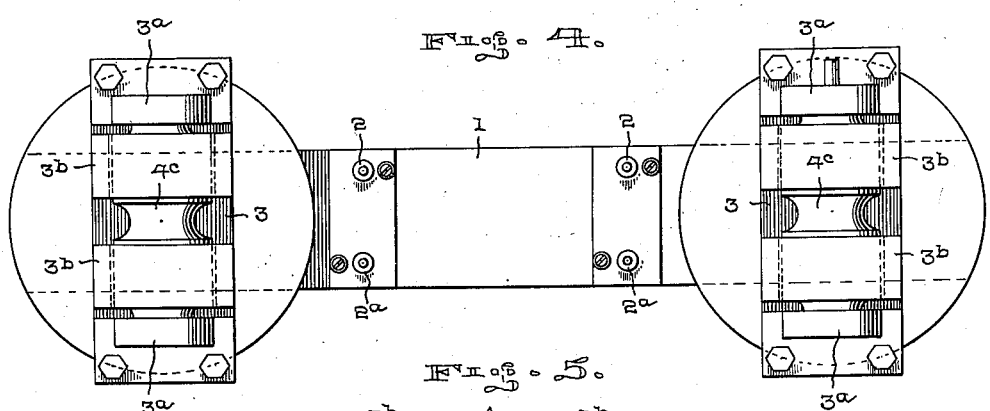
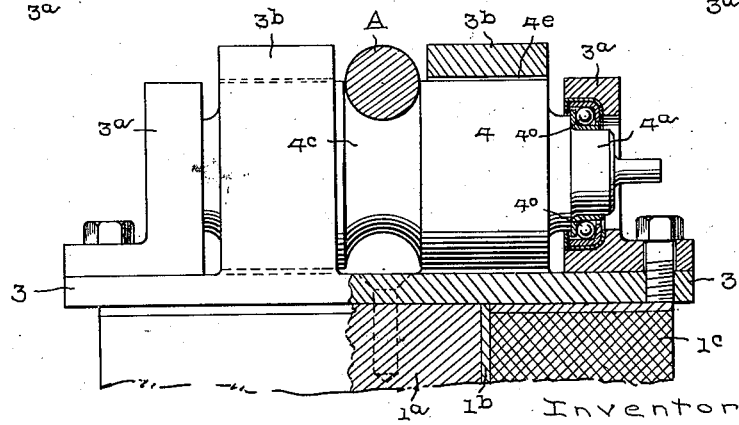
Inventor
Charles W. Burrows
By Alexander & Dowell
Attorneys

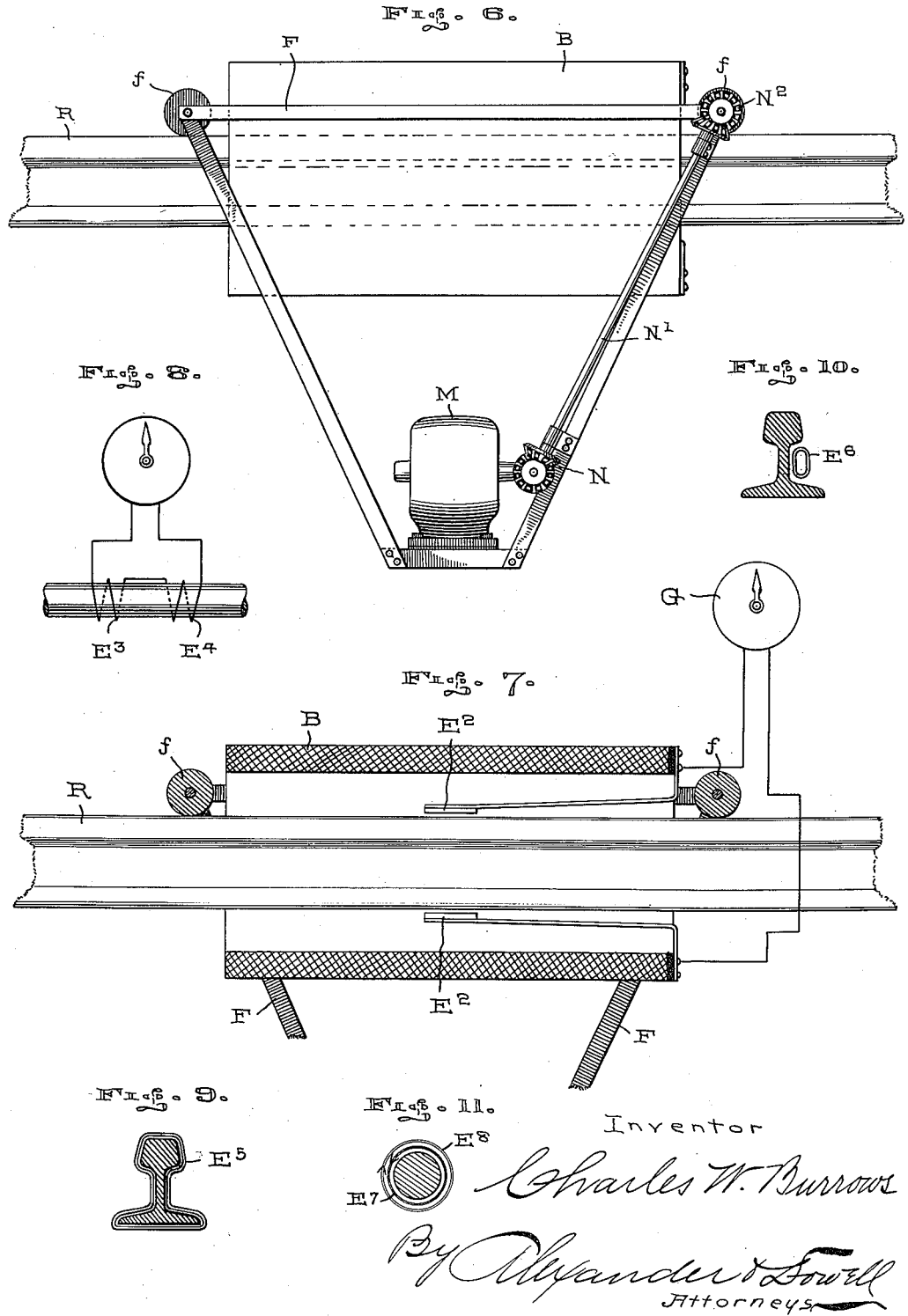

UNITED STATES PATENT OFFICE.

CHARLES W. BURROWS, OF WASHINGTON, DISTRICT OF COLUMBIA, ASSIGNOR OF ONE-FOURTH TO RUDOLPH J. WIG, OF WASHINGTON, DISTRICT OF COLUMBIA.

METHOD OF AND APPARATUS FOR TESTING MAGNETIZABLE OBJECTS BY MAGNETIC LEAKAGE.

1,322,405.  Specification of Letters Patent.  Patented Nov. 18, 1919.

Application filed October 4, 1917. Serial No. 194,756.

*To all whom it may concern:*

Be it known that I, CHARLES W. BURROWS, a citizen of the United States, residing at Washington, District of Columbia, have invented certain new and useful Improvements in Methods of and Apparatus for Testing Magnetizable Objects by Magnetic Leakage; and I hereby declare that the following is a full, clear, and exact description thereof, reference being had to the accompanying drawings, which form a part of this specification.

This invention is a novel method of and apparatus for detecting the presence of inhomogeneities in magnetizable metal bodies, and such as rods, cables, rails, etc.

The method consists in the determination of variation in one or more of the magnetic properties of a body of magnetizable material, which variation may exist between different parts of the specimen examined, and is based upon the principle that there is one and only one set of mechanical characteristics corresponding to a given set of magnetic characteristics, and conversely there is one and only one set of magnetic characteristics corresponding to a given set of mechanical characteristics.

In the practical application of this method each element of length of the specimen is subjected to the action of a magnetic field. This may be accomplished either by causing the field to move over the specimen or the specimen to move through the field. The magnetic field is kept constant so that any variation in magnetic induction is due to a corresponding variation in material and the change in induction is measured by means of one or more test coils which move relatively to the specimen.

An essential feature of the method is that the test coil is placed within the main magnetic field, and the current in the detector coils is produced or varied by magnetic leakage in the lines of force in the specimen being tested, any flaw or inhomogeneity in the specimen causing a deflection, or an outward flow of the lines of force and disturbing or varying the lines of force which normally pass through each element of length of the specimen undergoing inspection if the same is perfect.

In other words, in carrying out the method each element of length of the specimen to be inspected is subjected to magnetization by a uniform magnetic field, a test coil is placed within this magnetic field adjacent the specimen and relative motion is produced between the magnetic field with the test coil, and the specimen, and so long as the specimen is uniform there is no change in the number of lines of force from section to section of said specimen but wherever an imperfection, inhomogeneity or flaw occurs in the specimen, a leakage or a change in the number of lines of force passing through the specimen will be produced, which leakage eruption or irruption of lines of force will be cut by the test coil and produce a variation of the current in such test coil, which variation may be indicated by a suitable apparatus, and may be recorded or announced; thus the existence of such flaws can be demonstrated visually, and also may be recorded if desired, and actually located in the specimen.

Various apparatus may be designed for carrying out the method aforesaid, and in the accompanying drawings I have shown apparatus especially designed for testing cables, rods, rails and other long magnetizable bodies by this method, and the invention is hereinafter more fully explained with reference to said drawings to enable others to readily understand, adapt and use the invention, and the claims summarize the essentials of the invention and novel features of construction and combination of parts of the apparatus for which protection is desired.

In said drawings:—

Figure 1 is a diagrammatic view of a testing apparatus.

Fig. 2 is a side elevation of one practical form of apparatus for carrying out the invention.

Fig. 3 is an enlarged part side elevation and part sectional view through the main magnet of the apparatus shown in Fig. 2.

Fig. 4 is a top plan view of Fig. 3.

Fig. 5 is an enlarged end view and part sectional view showing one of the rotatable magnetic poles.

Fig. 6 is a diagrammatic elevation of a modified form of the apparatus.

Figure 7 is a sectional elevation of the part of Fig. 5, showing the major coil and a detecting coil.

Figs. 8, 9, 10, and 11, are detail views illustrating some of the various possible arrangements of test coils related to the object being tested.

In practically using the invention means are provided for magnetizing the specimen, or successive portions of the specimen to be tested if it be long, like a rod or cable for example, and in connection therewith detecting means or test coils are provided located within the magnetic field and preferably closely adjacent the specimen, the detecting means or test coils being kept stationary relatively to the main magnet, or magnetic field; and then producing a relative movement between the specimen and such test coil either by moving the magnetic field and test coil along the specimen being tested, or moving the specimen through or past the magnetic field and test coil.

To simplify the explanation of the invention and facilitate an understanding thereof I will first describe a very simple form of apparatus for testing rods or cables, and thereafter explain the at present preferred form of apparatus for testing mine cables.

Referring to the diagram, Fig. 1, A represents a specimen bar, rod, cable or like object of iron, steel or other magnetizable metal. Preferably surrounding this specimen is a solenoid B, which is connected with a suitable source of electricity, indicated at C, by which the solenoid is energized and caused to produce a powerful magnetic field around and in the portion of the specimen A within the solenoid. I have shown a solenoid in Fig. 1, but any other suitable electro-magnet or magnets might be used, so arranged adjacent the specimen A as so to produce a magnetic field therein. The lines of force of such magnetic field are conventionally indicated by the dotted lines D. Within this magnetic field and arranged close to the object A are one or more test coils E, and these test coils may be arranged either parallel with or at angles to the axis of the specimen, said test coils E are insulated from the solenoid and are connected with a galvanometer or other indicating device G, which should be a sensitive instrument. No current will be produced in the test coil E, so long as the specimen A is perfect and the fixed relation between the test coil E and the primary coil or magnet B is maintained, the parts being in the positions shown in Fig. 1.

If the magnetizing system be simultaneously moved longitudinally of the specimen, or the specimen be moved relatively to the magnets through the magnetic field, there will be no deflection of the galvanometer or the indicating device G produced provided the specimen is uniform throughout; but if in the course of this movement there should be a flaw or other defect in the specimen A, when such flaw enters the magnetic field it causes an eruption or irruption, or leakage, of the lines of force in the specimen. For instance, if there should be a flaw in the specimen at the point marked $a$ in Fig. 1 there will be a leakage of lines of force at such point and when it passes the test coil E, these leaking lines of force, will affect the coils E and produce a change of electromotive force and current therein, and if a suitable indicating or recording device is provided at G the presence of such flaw or inhomogeneity will be detected by reason of such change of electromotive force in the coil and can thus be located in the specimen. If a suitable indicator is provided its pointer will move in one direction as the flaw approaches the test coils E and in a reverse movement as the flaw leaves the test coils E. If the specimen contains more than one flaw or inhomogeneity each will be thus detected, and the larger the inhomogeneity the greater will be the deflection or disturbance of the indicator G. This action is based upon the premise or upon the fundamental fact of observation above stated—to wit "that there is one, and only one, set of mechanical characteristics corresponding to a given set of magnetic characteristics, and conversely there is one, and only one, set of magnetic characteristics corresponding to a given set of mechanical characteristics".

I am aware that it has heretofore been proposed to test metallic objects by passing them through a magnetic field, such as is produced by the solenoid B for example, the solenoid being connected in circuit with an indicator or ammeter and fluctuations of the ammeter indicating some flaw or inhomogeneities in the object; but such apparatus is inefficient and unreliable, because only very large inhomogeneities or flaws can be detected thereby, and even these cannot be detected with certainty because the effect or variation in the current through the major magnet B caused by even considerable inhomogeneities in the specimen A relatively is very minute.

In my invention I do not employ variations in the exterior solenoid or magnetic field producing means for determining defects in the specimen, but instead I use an independent or separate detecting means which is affected directly by variations in the leakage of magnetic lines of force in the specimen, such leakage occurring at any point of the specimen where a flaw or inhomogeneity exists, and such leaking lines of force being directly cut by the test coils and producing a relatively violent action of the galvanometer or indicator; and in practice by my method and apparatus I can detect flaws or inhomogeneities in specimens which it would be impossible to detect by connecting the solenoid B with an ammeter.

The employment of such detecting means or test coils in a relatively fixed magnetic field in position to be affected by the leakage of lines of force in or from the specimen in the manner stated, is the essentially novel feature of my method and apparatus for carrying out such method.

The apparatus shown in Figs. 2–5 is particularly designed for testing mine and elevator cables, rods, etc., and I will explain such apparatus and the manner of using same for testing cables to further elucidate the practical value of the invention.

Referring to Figs. 2–5, 1 designates an iron base plate or yoke to the opposite ends of which are securely attached iron cores 1$^a$, on which may be placed brass spools 1$^b$ wound with wire 1$^c$, these spools and cores forming with the yoke a powerful electromagnet. The terminals of the coils may be suitably connected to binding posts 2 and 2$^a$ of any suitable kind attached to the yoke 1, so that the said coils may be readily connected with any suitable source of electricity to energize the same as will be readily understood by those skilled in the art.

To the upper end of each core 1$^a$ is connected a head 3, which is provided with supports 3$^a$ for a rotatable pole-piece 4, which pole-piece has trunnions 4$^a$ preferably supported by ball or roller bearings 40 in the supports 3$^a$ so that the pole-piece can freely rotate on the head 3. The pole-piece extends through cylindric openings in projections 3$^b$, formed integral with the heads 3 and intermediate the supports 3$^a$, said projections having openings for the passage of the pole-piece 4 and slightly greater in diameter than the external diameter of the pole-piece which extends therethrough, see Fig. 5, so that there is a slight air gap, indicated at 4$^e$, between the pole-piece 4 and the surrrounding walls of projections 3$^b$ and consequently there is no actual frictional or sliding contact between the pole-piece and the head; and the pole-piece while strongly magnetized is not locked against rotation.

The yoke 1 can be attached to any suitable support adjacent the run of the cable C, so that the cable will lie in the grooves 4$^c$ and run successively from one pole-piece to the other. Each pole-piece is preferably provided with a groove 4$^c$ intermediate the projections 3$^b$ which groove serves to guide the cable C, or other specimen being tested, and the pole-pieces being strongly magnetized attract and hold the cable in the grooves 4$^c$ while permitting the cable to freely move endwise therepast.

When the magnet is energized a magnetic field will be established and there will be a flow of lines of force between the pole-pieces 4 and through that section of the cable lying intermediate the pole-pieces 4, which section will be strongly magnetized, and whether the cable be moved through the magnetic field or the magnetic field be moved along the cable the section of the cable at any time intermediate the pole-pieces 4 will be magnetized in substantially the same manner that the section of the specimen A within the solenoid B (Fig. 1) is magnetized.

Intermediate the pole-pieces 4 is arranged a detecting means or test coil or coils E; such test coils may be variously shaped and located. As shown in Fig. 2 a rectangular coil E' is preferably bent to partially surround the cable C and arranged to lie close thereto without actually contacting therewith. The terminals of this test coil E' are connected with any suitable electric indicating or recording device G, adapted to indicate changes of electromotive force in the test coil. The construction of such indicator or recorder is not a feature of the present invention and can be selected by the constructor or engineer building or using the apparatus.

So long as the successive portions of the cable or specimen extending between the pole-pieces 4 are uniform and perfect the test-coil E' will not be affected, and there will be no deflection of the indicator G. If however there is a flaw or defect in any part of the cable, as soon as such defect enters the magnetic field and approaches the testing means or coil E' the latter will be affected by the leakage of lines of force in the specimen at such defect and the change in electromotive force in the test coil will cause a deflection of the indicator in one direction as the defect approaches the coil and in the reverse direction as the defect leaves the coil.

From the foregoing it will be understood that with such detecting or testing method and apparatus the entire length of the cable can be easily explored and any defects therein detected and located. In practice one or more of such testing apparatus could be installed permanently at any suitable point or points in the run of the cable, and tests thereof be made continuously or at frequent intervals, as desired; and when a defect arises in the cable such defect can be detected and located in the cable.

Such apparatus could be used for testing rails, rods, or other magnetizable objects having considerable length. If such apparatus should be used for testing rods or rails, the apparatus could itself be moved along the rails instead of moving the rail past the apparatus.

A simple form of apparatus for testing rails or bars is shown in Figs. 6 and 7. As shown in these figures a solenoid B is attached to a frame F provided with rollers $f$ at its ends so that the solenoid can be slipped over a bar or rail, indicated at R, and be movably supported thereon by the rollers $f$. The frame F may carry an electric motor M which is operatively connected by suitable gearing and shafting indicated at N. N. with one of the rollers $f$, and when the motor is running it will propel the frame and solenoid lengthwise of the rail. Within the solenoid are arranged one or more test coils $E^2$ which are suitably electrically connected with an indicator or recorder G. When the current is turned on and the main magnet energized the apparatus is caused to travel along the rail and any defect or inhomogeneity in the rail will be detected in the manner described.

One or more test coils may be employed according to the nature or contour of the specimen being tested, and such coils may be arranged either with their axis parallel with or at angles to the longitudinal axis of the specimen being tested; but such test coils should be so arranged adjacent the specimen that they will intercept or cut lines of force leaking from such specimen.

Where it is feasible to surround the specimen with a test coil I prefer to have the test coils arranged with their axes parallel with the axis of the specimen and close thereto as in Fig. 8; and in some cases I prefer to use a plurality of test coils wound in series but oppositely as indicated in Fig. 8; wherein test coil $E^3$ is preferably wound appositely to test coil $E^4$. If the specimen is regular the coil might be shaped to conform to the specimen as indicated in Fig. 9. A plurality of flat coils may be placed around adjacent the specimen within the magnetic field so as to conform as nearly as possible to the cross section contour of the specimen to be tested.

In some cases the coils may be arranged beside the specimen with their axes parallel with the axis of the specimen, as indicated in Fig. 10, wherein the coil $E^6$ is arranged beside the web of the rail.

The test coils might in some cases be advantageously arranged one inside the other as in Fig. 11, where an inner test coil $E^7$ surrounds the object, and is in turn surrounded by an outer test coil $E^8$, the said coils $E^7$ $E^8$ being preferably oppositely wound and connected in series. I do not however consider the invention restricted to any particular construction or relative arrangement of test coils, the essential being that a suitable test coil, or detecting means, be located adjacent the specimen being tested and within the magnetic field so that said test coils or detecting means will be affected by the leakage of magnetic lines of force in, from or to said specimen.

I claim:

1. The method of detecting inhomogeneities in magnetizable objects; consisting in producing a magnetic field about such object; placing a test coil in said magnetic field; producing relative movement between said object and test coil; and observing variations in the electromotive force induced in said coil by the change in the number of lines of force threading said test coil.

2. The method of detecting inhomogeneities in magnetizable objects; consisting in placing said object in a magnetic field; placing a test coil in said magnetic field adjacent the object; producing relative movement between said object and test coil; and observing variations in the current from said test coil produced by leakage of lines of force in, to or from said object.

3. The herein described method of detecting inhomogeneities in magnetizable bodies; consisting in subjecting such a body to the action of a magnetic field; placing a test coil in such magnetic field adjacent the body; producing relative movement between the test coil and body within said field; and observing fluctuations in the current in the test coil produced by the leakage of lines of force from said body.

4. The herein described method of detecting inhomogeneities in magnetizable bodies; consisting in subjecting successive sections of such a body to the action of a magnetic field; placing a detecting means in such magnetic field adjacent the body; producing relative movement between the detecting means and body within said field and observing fluctuations of electromotive force in the detecting means produced by the change in leakage of lines of force in the section of said body within said magnetic field.

5. The herein described method of detecting inhomogeneities in magnetizable metal bodies; consisting in subjecting successive sections of such a body to the action of a magnetic field; placing a test coil in such magnetic field adjacent the body; producing relative movement between the test coil and body within said field and observing fluctuations in the current in the test coil produced by the leakage of lines of force from the section of said body within said magnetic field.

6. The method of detecting inhomogeneities in magnetizable objects; consisting in producing a magnetic field around a specimen to be tested; placing a test coil within said magnetic field adjacent the specimen; producing relative movement between said magnetic field and test coil and the specimen to successively energize successive portions of the length of the specimen; and observing variations of electromotive force in the test coil produced by change in leakage of lines of force from the specimen.

7. The herein described method of detecting inhomogeneities in magnetizable specimens; consisting in producing a magnetic field; producing relative movement of said field and specimen; placing and maintaining within said field a test coil adjacent the surface of the specimen, and observing the variations in the current from said test coil produced by the change in leakage of magnetic lines of force from said specimen during the relative movement of said specimen and test coil; the test coil and magnetic field being relatively stationary.

8. The herein described method of detecting inhomogeneities in magnetizable specimens; consisting in producing a magnetic field; subjecting successive portions of such specimen to said field by producing relative movement of said field along the length of the specimen; placing and maintaining within said field a test coil adjacent the surface of the specimen, and observing the variations in the current from said test coil produced by variations in the leakage or projection of magnetic lines of force from said specimen during the relative movement of said specimen and test coil, said test coil and magnetic field being relatively stationary.

9. In apparatus for detecting inhomogeneities in magnetizable objects; means for magnetizing an object; a detecting means in the resultant magnetic field adjacent the object, means for producing relative movement between said object and detecting means, and means for indicating variations of electromotive force in the detecting means produced by leakage of lines of force from said object.

10. In apparatus for detecting inhomogeneities in magnetizable objects; means for producing a magnetic field around said object; detecting means in said magnetic field adjacent the object, means for producing relative movement between said object and detecting means, and means for indicating variations of electromotive force in said detecting means produced by leakage of lines of force from said object, 11. Apparatus for detecting inhomogeneities in magnetizable objects; comprising means for locally magnetizing a specimen to be tested; detecting means within the resultant magnetic field adjacent the specimen; means for producing relative movement between said detecting means in magnetic field and the specimen, and means for indicating variations of electromotive force in said detecting means produced by leakage of lines of force from the specimen.

12. In apparatus for detecting inhomogeneities in magnetizable objects; means for magnetizing an object; a test coil in the resultant magnetic field adjacent the object, means for producing relative movement between said object and test coil, and means for detecting variations in the magnetic current from said test coil produced by leakage of lines of force from said object.

13. In apparatus for detecting inhomogeneities in magnetizable objects; means for producing a magnetic field around said object; a test coil in said magnetic field adjacent the object, means for producing relative movement between said object and test coil, and means for detecting variations in the magnetic current from said test coil produced by leakage of lines of force from said object.

14. Apparatus for detecting inhomogeneities in magnetizable objects; comprising means for locally magnetizing a specimen to be tested; a test coil within the resultant magnetic field adjacent the specimen; means for producing relative movement between said magnetic field and test coil and the specimen, and means for detecting variations in the current from said test coil produced by leakage of lines of force from the specimen.

15. Apparatus for detecting inhomogeneities in magnetizable objects; comprising means for producing a magnetic field around a specimen to be tested; a test coil within said magnetic field adjacent the specimen; means for producing relative movement between said magnetic field and test coil and the specimen whereby successive portions of the length of the specimen are successively energized, and means for detecting variations in the current from said test coil produced by leakage of lines of force from the specimen.

16. In apparatus for testing cables and the like, means for locally magnetizing the cable, means for producing relative movement of the resultant magnetic field and cable longitudinally of the cable, detecting means in said field adjacent the cable; and means for indicating variations of electromotive force in said detecting means produced by leakage of lines of force from the cable.

17. In apparatus for testing cables and the like, means for producing a magnetic field around the cable, means for producing relative movement of the field and cable longitudinally of the cable, detecting means in said field adjacent the cable and means for indicating variations of electromotive force in said detecting means produced by leakage of lines of force from the cable within said magnetic field.

18. In apparatus for testing cables and the like, means for locally magnetizing the cable, means for producing relative movement of the resultant magnetic field and cable longitudinally of the cable, a test coil in said field adjacent the cable; and means for detecting variations in the circuit of said test coil produced by leakage of lines of force from the cable within said magnetic field.

19. In apparatus for testing cables and the like, means for producing a magnetic field around the cable, means for producing relative movement of the field and cable longitudinally of the cable, a test coil in said field adjacent the cable and means for detecting variations in the current from said coil produced by leakage of lines of force from the cable within said magnetic field.

20. In apparatus for detecting inhomogeneities in magnetizable objects, the combination of an electro-magnet for producing a powerful local magnetic field in the specimen being tested, said field being movable relatively to the specimen and longitudinally thereof, so as to successively magnetize successive adjacent sections of said specimen, a test coil within and relatively stationary to said magnetic field, and adjacent the specimen, and means for detecting variations in the current induced in said test coil by lines of force leaking from said specimen.

21. In apparatus for detecting inhomogeneities in magnetizable objects, the combination of an electro-magnet for producing a powerful magnetic field around the object, said magnet being movable relatively to the specimen being tested and longitudinally thereof, so as to progressively magnetize successive adjacent sections of said specimen; a test coil within and relatively stationary to said magnetic field and adjacent the specimen; and means for detecting variations in the current induced in said test coil by lines of force leaking or projecting from said specimen, substantially as described.

22. A magnet having a core provided with a head, a pole piece rotatably mounted on said head and spaced therefrom, and roller bearings supporting said pole piece on the head.

23. A magnet for the purpose specified, comprising a metallic base, cores attached thereto, coils surrounding said cores, rotatable pole pieces mounted on and spaced from the cores, and roller bearings supporting the pole pieces on the cores.

24. A magnet for the purpose specified, comprising a metallic base, cores attached thereto, coils surrounding said cores, heads attached to said cores, rotatable pole pieces mounted on and spaced from the heads, and roller bearings supporting the pole pieces on the heads.

In testimony that I claim the foregoing as my own, I affix my signature.

CHARLES W. BURROWS.